J. P. BAIRD.
HOSE COUPLING.
APPLICATION FILED JULY 17, 1906. RENEWED DEC. 16, 1908.
928,237.
Patented July 20, 1909.
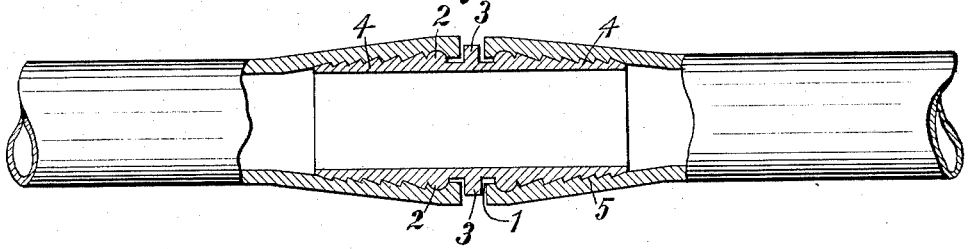
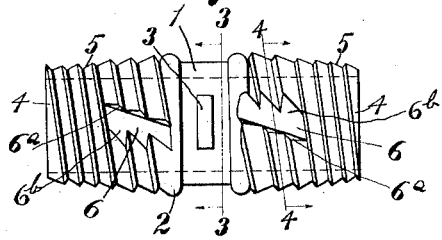
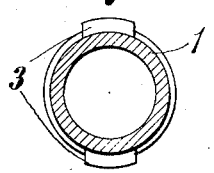
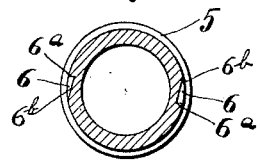
Witnesses:
Edw. Lindenmuller.
Harry J. Gettins.
Inventor:
John P. Baird
By Okd C. Billman
His Attorney.

UNITED STATES PATENT OFFICE.

JOHN P. BAIRD, OF DETROIT, MICHIGAN.

HOSE-COUPLING.

No. 928,237.  Specification of Letters Patent.  Patented July 20, 1909.

Application filed July 17, 1906, Serial No. 326,596.  Renewed December 16, 1908.  Serial No. 467,809.

*To all whom it may concern:*

Be it known that I, JOHN P. BAIRD, a citizen of the United States, residing at Detroit, in the county of Wayne and State of Michigan, have invented certain new and useful Improvements in Hose-Couplings, of which the following is a specification.

My invention relates to improvements in hose-couplings designed for use in connecting and repairing hose-pipes such as garden, fire, or other flexible hose commonly used to convey water under pressure.

The paramount object of the invention is to produce a generally improved device of this class which will be exceedingly simple in construction, cheap of manufacture, efficient in use, and much better adapted to its intended uses than any other device of the same class with which I am acquainted.

Another object is to provide an improved "patch", or "hose-mending" coupling whereby old or defective hose may be readily and effectively mended by cutting the hose in two at the defective spot, or cutting out the bad portion, and uniting the ends of the perfect hose by screwing the ends of the coupling in the open ends of the hose, as hereinafter more fully described.

With these ends in view, the invention consists in the novel construction, arrangement and combination of parts, hereinafter described, illustrated in the accompanying drawings, and particularly pointed out in the appended claims:

Referring to the drawings, forming a part of this specification, Figure 1, is a sectional view of my improved coupling in its operative position applied to the connecting ends of a hose-pipe. Fig. 2, a side elevation of the same detached. Fig. 3, a transverse sectional view taken through line 3, 3, of Fig. 2. Fig. 4, a transverse sectional view taken through line 4, 4, of Fig. 2.

Similar characters of reference designate like parts throughout all the figures of the drawings.

The improved coupling consists, essentially, of a hollow cylindrical main body portion provided with a plain intermediate portion 1, having on each side thereof an integral ring or beading 2, and at its longitudinal center provided with oppositely-disposed shoulders or lugs 3, adapted to form stops to abut against the ends of the hose, as shown in Fig. 1, and afford means for revolving the coupling for the purpose of connecting and disconnecting the same to and from the adjacent ends of the hose, as hereinafter more fully described.

The improved coupling is provided on each side of said annular ring or beaded portions 2, with peripherally-tapering end portions 4, provided with reversible spiral threads 5, preferably trapezoidal in form as shown.

A pair of oppositely-disposed longitudinally-extending notches or recesses 6, are formed in the threads 5, and extend, in the present instance, from the beaded portions 2, to the longitudinal center of the peripherally-tapering end portions 4. They may, however, extend the entire length thereof if desired.

It will be observed that said notches or recesses 6, are each provided with a shoulder $6^a$, at one side in the direction in which the coupling is rotated in screwing the end of the coupling into the hole of the hose-pipe, and at the other with an inclined or sloping portion $6^b$, so that when the coupling is rotated in the opposite direction for unscrewing the same said shoulder $6^a$, will engage the inner walls of the contiguous hose-pipe thus forming a lock to prevent the unscrewing of the hose-pipe therefrom, as hereinafter more fully described.

It will be obvious that by inserting the end of the improved coupling into the hole of the end of the hose-pipe and screwing the threaded peripherally-tapering end portions therein said hose-pipe will be spread open thereon until the end of the hose-pipe is forced up against the lugs or stops 3, adapted to abut against the same. The contiguous walls of the hose-pipe will thus be caused to snugly embrace the walls of the coupling, and the trapezoidal threads 5, and annular beadings 2, will prevent the coupling from being withdrawn from the ends of the hose-pipe.

By reason of the construction of the threads, and recesses formed therein, the hose passes freely over the coupling as the same is screwed into the end of the hose and by the time the end of the hose has reached the lugs or stops 3, the shoulders $6^a$, of the notches or recesses 6, will be embedded in the contiguous walls of the hose and thus prevent the unscrewing of the coupling.

When it is desired to take out or remove the coupling, the surrounding walls of the hose can be cut, thus allowing the same to be taken therefrom without any trouble so that it can be used again as desired.

From the foregoing description, taken in connection with the accompanying drawings, the operation and advantages of my invention will be readily understood.

Having thus described my invention, without having attempted to set forth all the forms in which it may be made or all the modes of its use, I declare that what I claim and desire to secure by Letters Patent, is,—

1. A hose-coupling, consisting of a pipe provided with threaded peripherally-tapering end portions, shoulders or lugs formed intermediate said end portions, and notches or recesses formed in said threaded portions and affording a shoulder on one side and a sloping portion on the other.

2. A hose-coupling, consisting of a pipe provided with peripherally-tapering end portions, oppositely-disposed lugs at the longitudinal center thereof, threads formed in said tapering end portions, and longitudinally-extending notches formed in said threads providing shoulders on one side and inclined portions on the other.

3. A hose-coupling, consisting of a pipe provided with threaded peripherally-tapering end portions, and a plain intermediate portion having on each side thereof an integral annular beading, oppositely-disposed lugs formed with said intermediate portion, and oppositely-disposed longitudinally-extending recesses formed in said threaded portions.

4. In a hose-coupling, the combination with a pipe provided with oppositely-disposed tapering threaded portions, and lugs formed intermediate said threaded portions; of oppositely-disposed recesses formed in said threaded portions.

5. In a hose-coupling, the combination with a pipe provided with threaded portions, and an intermediate portion provided with lugs; of recesses formed in said threaded portions and affording shoulders on one side thereof in the direction in which the coupling is adapted to be rotated.

6. In a hose-coupling, the combination with a pipe provided with tapering portions provided with trapezoidal threads, and an intermediate portion provided with lugs; of longitudinally-extending recesses formed in said threads and having inclined portions on the sides thereof opposite the direction in which the coupling is adapted to be rotated.

7. In a hose-coupling, the combination with a pipe provided with end portions having trapezoidal threads; of recesses formed in said threads, one of the sides thereof being inclined and the other affording a shoulder.

In testimony whereof I have signed my name to this specification in the presence of two subscribing witnesses.

JOHN P. BAIRD.

Witnesses:
 W. H. ANDERSON,
 ARTHUR G. SCHUCK.